Figure 1:
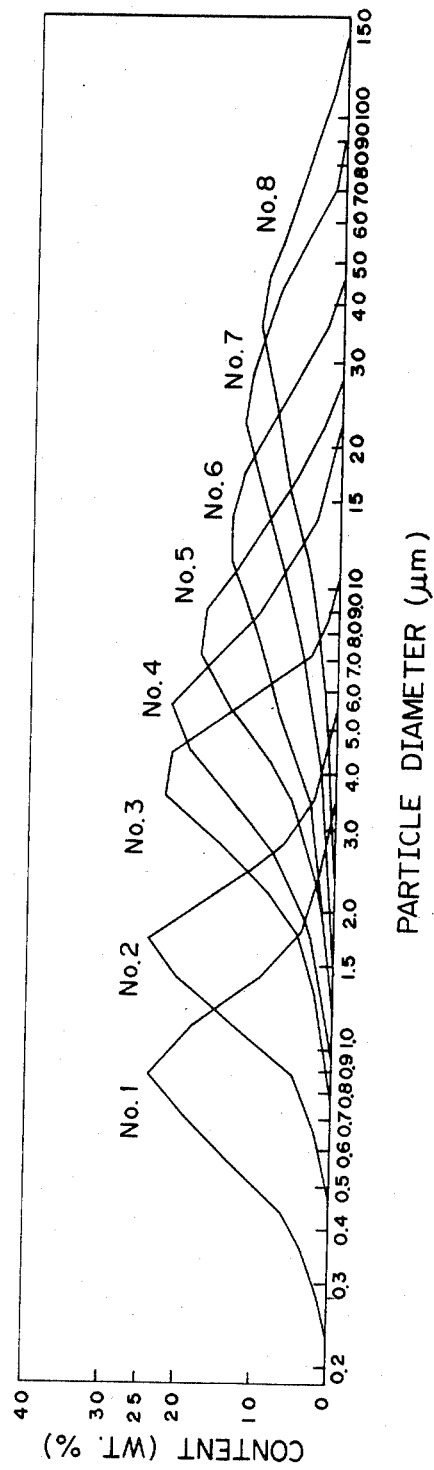

United States Patent [19]

Arakawa et al.

[11] Patent Number: 4,547,672

[45] Date of Patent: Oct. 15, 1985

[54] RADIATION IMAGE STORAGE PANEL

[75] Inventors: Satoshi Arakawa; Kenji Takahashi, both of Minami-ashigara, Japan

[73] Assignee: Fuji Photo Film Co. Ltd., Kanagawa, Japan

[21] Appl. No.: 485,834

[22] Filed: Apr. 18, 1983

[30] Foreign Application Priority Data

Apr. 20, 1982 [JP] Japan .................................. 57-65609

[51] Int. Cl.$^4$ .............................................. G01J 1/58
[52] U.S. Cl. .................................................. 250/483.1
[58] Field of Search ................. 250/483.1, 486.1, 484.1

[56] References Cited

U.S. PATENT DOCUMENTS

| | | | |
|---|---|---|---|
| 2,310,852 | 2/1943 | Leuerneng | 250/486.1 |
| 2,412,654 | 12/1946 | Sadowsky | 250/486.1 |
| 4,068,128 | 1/1978 | Chenot et al. | 250/483.1 |
| 4,437,011 | 3/1984 | Noji et al. | 250/486.1 |

Primary Examiner—Bruce C. Anderson
Attorney, Agent, or Firm—Murray, Whisenhunt & Ferguson

[57] ABSTRACT

A radiation image storage panel having a phosphor layer comprising a binder and a stimulable phosphor dispersed therein, in which said stimulable phosphor has such a particle size distribution that phosphor particles having a diameter of not less than 100 μm are present in an amount of not more than 1% by weight and phosphor particles having a diameter of not less than 1 μm are present in an amount of not less than 50% by weight. The panel shows high sensitivity and good image characteristics.

7 Claims, 1 Drawing Figure

RADIATION IMAGE STORAGE PANEL

This invention relates to a radiation image storage panel using a stimulable phosphor, and more particularly to a radiation image storage panel which shows high sensitivity and excellent image characteristics (sharpness and graininess) being well balanced therebetween.

As a method of obtaining a radiation image, a radiation image recording and reproducing method described in U.S. Pat. Nos. 3,859,527, 4,258,264, 4,236,078, and 4,239,968 is paid much attention. In this radiation image recording and reproducing method, there is employed a radiation image storage panel comprising a stimulable phosphor which emits light when stimulated by an electromagnetic wave such as visible light and infrared rays (referred to hereinafter as "stimulating rays") after exposure to a radiation. The term "radiation" as used herein means an electromagnetic wave or a corpuscular radiation, such as X-rays, $\alpha$-rays, $\beta$-rays, $\gamma$-rays, high energy neutron rays, cathode rays, vacuum ultraviolet rays, or ultraviolet rays. The above-cited method involves steps of (1) causing the stimulable phosphor of the panel to absorb a radiation having passed through an object; (2) scanning the panel with stimulating rays to sequentially release the radiation energy stored in the panel as light emission; and (3) electrically processing the emitted light to give an image.

In the radiation image recording and reproducing method, it is desired that a radiation image is recorded and reproduced with high sensitivity, as well as that the quality of image (sharpness and graininess) obtained by the method is high. The sensitivity in the method and the quality of the image by the method are highly dependent on the characteristics of the radiation image storage panel employed, even though these are also dependent on natures of a photoelectric conversion device and an image processing procedure employed, and others.

It is, accordingly, a primary object of the present invention to provide a radiation image storage panel showing high sensitivity, as well as excellent image characteristics.

According to studies of the present inventors, it has been discovered that stimulable phosphor having a larger particle diameter provides improvement in the sensitivity of the radiation image storage panel, but deteriorates the image characteristics thereof. It has been further discovered that stimulable phosphor having a smaller particle diameter provides improvement in the image characteristics of the panel, but reduces the sensitivity thereof.

Furthermore, subsequent studies of the inventors have revealed that a radiation image storage panel containing, in its stimulable phosphor layer, large stimulable phosphor particles having a particle diameter of not less than 100 $\mu$m shows extremely deteriorated image characteristics when such large phosphor particles are included therein in an amount of more than 1% by weight of the whole phosphor particles, and that a radiation image storage panel shows extremely reduced sensitivity when small phosphor particles having a particle diameter of less than 1 $\mu$m occupy more than 50% by weight of the whole phsophor particles. As the result, it has been discovered that a radiation image storage panel showing satisfactory sensitivity and image characteristics being well balanced therebetween can be obtained only where the stimulable phosphor used therein has such a particle size distribution that phosphor particles having a diameter of not less than 100 $\mu$m are present in an amount of not more than 1% by weight and phosphor particles having a diameter of not less than 1 $\mu$m are present in an amount of not less than 50% by weight.

Accordingly, there is provided by the invention a radiation image storage panel having a phosphor layer comprising a binder and a stimulable phosphor dispersed therein, in which said stimulable phosphor has such a particle size distribution that phosphor particles having a diameter of not less than 100 $\mu$m are present in an amount of not more than 1% by weight and phosphor particles having a diameter of not less than 1 $\mu$m are present in an amount of not less than 50% by weight, preferably not less than 60% by weight.

In the invention, the particle size distribution preferably is such that phosphor particles having a diameter of not less than 60 $\mu$m are present in an amount of not more than 1% by weight and phosphor particles having a diameter of not less than 2 $\mu$m are present in an amount of not less than 50% by weight, preferably not less than 60% by weight. More preferred is such a particle size distribution that phosphor particles having a diameter of not less than 30 $\mu$m are present in an amount of not more than 2% by weight and phosphor particles having a diameter of not less than 5 $\mu$m are present in an amount of not less than 35% by weight, preferably not less than 50% by weight.

The present invention will be described in more detail hereinbelow by examples of radiation image storage panels using a divalent europium activated barium fluorobromide (BaFBr:Eu$^{2+}$) phosphor as the stimulable phosphor.

Several radiation image storage panels were prepared using BaFBr:Eu$^{2+}$ phosphors having different particle size distributions. The particle size distributions of the phosphors used in the examples are graphically illustrated in the attached FIGURE under Nos. 1 through 8.

The particle size distributions of the BaFBr:Eu$^{2+}$ phosphors are otherwise described as follows:

| Phosphor No. 1 | | |
|---|---|---|
| particles of $\geq$ | 100 $\mu$m (diameter) | 0 wt. % |
| particles of $\geq$ | 1 $\mu$m (diameter) approx. | 35 wt. % |
| Phosphor No. 2 | | |
| particles of $\geq$ | 100 $\mu$m (diameter) | 0 wt. % |
| particles of $\geq$ | 1 $\mu$m (diameter) approx. | 88 wt. % |
| particles of $\geq$ | 60 $\mu$m (diameter) | 0 wt. % |
| particles of $\geq$ | 2 $\mu$m (diameter) approx. | 28 wt. % |
| particles of $\geq$ | 30 $\mu$m (diameter) | 0 wt. % |
| particles of $\geq$ | 5 $\mu$m (diameter) | 1 wt. % |
| Phosphor No. 3 | | |
| particles of $\geq$ | 100 $\mu$m (diameter) | 0 wt. % |
| particles of $\geq$ | 1 $\mu$m (diameter) approx. | 99 wt. % |
| particles of $\geq$ | 60 $\mu$m (diameter) | 0 wt. % |
| particles of $\geq$ | 2 $\mu$m (diameter) approx. | 89 wt. % |
| particles of $\geq$ | 30 $\mu$m (diameter) | 0 wt. % |
| particles of $\geq$ | 5 $\mu$m (diameter) approx. | 18 wt. % |
| Phosphor No. 4 | | |
| particles of $\geq$ | 100 $\mu$m (diameter) | 0 wt. % |
| particles of $\geq$ | 1 $\mu$m (diameter) approx. | 99 wt. % |
| particles of $\geq$ | 60 $\mu$m (diameter) | 0 wt. % |
| particles of $\geq$ | 2 $\mu$m (diameter) approx. | 95 wt. % |
| particles of $\geq$ | 30 $\mu$m (diameter) | 0 wt. % |
| particles of $\geq$ | 5 $\mu$m (diameter) approx. | 55 wt. % |
| Phosphor No. 5 | | |
| particles of $\geq$ | 100 $\mu$m (diameter) | 0 wt. % |
| particles of $\geq$ | 1 $\mu$m (diameter) | 100 wt. % |

| | -continued | |
|---|---|---|
| particles of ≧ | 60 μm (diameter) | 0 wt. % |
| particles of ≧ | 2 μm (diameter) approx. | 98 wt. % |
| particles of ≧ | 30 μm (diameter) | 0 wt. % |
| particles of ≧ | 5 μm (diameter) approx. | 75 wt. % |
| Phosphor No. 6 | | |
| particles of ≧ | 100 μm (diameter) | 0 wt. % |
| particles of ≧ | 1 μm (diameter) | 100 wt. % |
| particles of ≧ | 60 μm (diameter) | 0 wt. % |
| particles of ≧ | 2 μm (diameter) approx. | 99 wt. % |
| particles of ≧ | 30 μm (diameter) approx. | 4 wt. % |
| particles of ≧ | 5 μm (diameter) approx. | 84 wt. % |
| Phosphor No. 7 | | |
| particles of ≧ | 100 μm (diameter) | 0 wt. % |
| particles of ≧ | 1 μm (diameter) | 100 wt. % |
| particles of ≧ | 60 μm (diameter) approx. | 2 wt. % |
| particles of ≧ | 2 μm (diameter) approx. | 99 wt. % |
| particles of ≧ | 30 μm (diameter) approx. | 25 wt. % |
| particles of ≧ | 5 μm (diameter) approx. | 96 wt. % |
| Phosphor No. 8 | | |
| particles of ≧ | 100 μm (diameter) approx. | 2 wt. % |
| particles of ≧ | 1 μm (diameter) | 100 wt. % |

The radiation image storage panels No. 1 through No. 8 were prepared by the following procedures, using $BaFBr:Eu^{2+}$ phosphors having the above-mentioned particle size distributions identified under No. 1 through No. 8, respectively.

Eight parts by weight of $BaFBr:Eu^{2+}$ phosphor and one part by weight of nitrocellulose (binder) were mixed in a solvent (a mixture of acetone, ethyl acetate and butyl acetate) to prepare a coating dispersion having a viscosity of 50 centistokes. The coating dispersion was evenly applied onto a polyethylene terephthalate film (support) positioned horizontally. The so coated film was allowed to stand for a day to form a phosphor layer having a thickness of approximately 300 μm. Thus, a radiation image storage panel was obtained.

Then, each of the so prepared radiation image storage panel was evaluated on the sensitivity, sharpness and graininess.

The sensitivity of the panel was determined as follows:

The panel was exposed to X-rays of 80 KVp and subsequently was scanned with a He-Ne laser beam (633 nm). The light emitted by the phosphor layer of the panel was detected and converted to the corresponding electric signal by means of a photosensor (a photomultiplier having spectral sensitivity of type S-5). The sensitivity of the panel was determined from the level of the electric signal.

The sharpness was determined as follows:

The panel was exposed to X-rays of 80 KVp through an MTF chart made of lead, and subsequently the panel was scanned with a He-Ne laser beam. The light emitted by the phosphor layer of the panel was detected and converted to the corresponding electric signal by means of the above-mentioned photosensor. The electric signal was converted to the corresponding image signal by means of an analogue-digital converter, and the image signal was recorded on a magnetic tape. The magnetic tape was then analyzed in a computer to produce the modulation transfer function (MTF) of the X-ray image recoreded thereon. The MTF value was produced and given as an MTF value (%) at the spacial frequency of 2 cycle/mm.

The graininess was determined as follows:

The panel was exposed to X-rays of 80 KVp and subsequently scanned with a He-Ne laser beam. The light emitted by the phosphor layer of the panel was detected and converted to the electric signal by means of the above-mentioned photosensor. The electric signal was then recorded on an ordinary photographic film by means of a film scanner. The visible image reproduced on the film was observed with eyes to evaluate the graininess.

The results of the evaluations on the sensitivity, sharpness and graininess are set forth in Table 1 below, in which the sensitivity is given as a relative value. The graininess is given as a relative mark selected from A, B, C and D, which were determined by comparison with the graininess of a visible image produced on an X-ray photographic film (RX type, prepared by Fuji Photo Film Co., Ltd., Japan) through the conventional X-ray photographic method using a radiographic intensifying screen (Hi-Screen STD, prepared by Fuji Photo Film Co., Ltd.). The mark A means that the graininess of the panel was better than that of the visible image given by the conventional X-ray photographic method; the mark B means that the graininess of the panel was as good as that of the conventional photographic image; the mark C means that the graininess of the panel was somewhat worse than that of the conventional photographic image; and the mark D means that the graininess of the panel was extremely worse than that of the conventional photographic image.

TABLE 1

| Panel No. | Particle Size Distribution No. | Sensitivity | Sharpness (MTF, %) | Graininess |
|---|---|---|---|---|
| 1 | 1 | 1.5 | 75 | A |
| 2 | 2 | 10 | 60 | A |
| 3 | 3 | 25 | 46 | A |
| 4 | 4 | 60 | 38 | B |
| 5 | 5 | 80 | 30 | B |
| 6 | 6 | 120 | 20 | C |
| 7 | 7 | 130 | 15 | C |
| 8 | 8 | 140 | 8 | D |

As is evident from the results set forth in Table 1, the radiation image storage panel containing a large amount of greater stimulable phosphor particles shows an increased sensititivy, but shows deteriorated image characteristics (sharpness and graininess). On the contrary, the radiation image storage panel containing a large amount of smaller stimulable phosphor particles shows improved image characteristics, but shows decreased sensitivity.

More in detail, the results indicate the following.

The panel No. 1 gives extremely lower sensitivity than the panel No. 2. Accordingly, in comparison between the content of phosphor particles having a diameter of not less than 1 μm in the panel No. 1 and that in the panel No. 2, it is understood that the sensitivity is markedly reduced in the case of using a phosphor in which phosphor particles having a diameter of not less than 1 μm are included in an amount of not more than 50% by weight, particularly not more than 60% by weight, of the whole phosphor particles.

The panel No. 8 gives extremely worse image characteristics than the panel No. 7. Accordingly, it is understood that the image charactetistics are deteriorated to an undesired level in the case of using a phosphor in which phosphor particles having a diameter of not less than 100 μm are included in an amount exceeding approximately 1% by weight of the whole phosphor particles.

In contrast, the radiation image storage panels No. 2 through No. 7 having particle size distributions in which phosphor particles having a diameter of not less than 1 μm are included in amounts of not less than approximately 50% by weight, preferably not less than approximately 60% by weight, and more preferably not less than approximately 88% by weight, and phosphor particles having a diameter of not less than 100 μm are included in amounts of not more than approximately 1% by weight are satisfactory in the sensitivity, as well as in the image characteristics, being well balanced therebetween.

Out of these panels, the radiation image storage panels No. 3 through No. 6 provide very excellent results. Accordingly, in comparison between the content of phosphor particles having a diameter of not less than 2 μm in the panel No. 2 and that in the panel No. 3, it is understood that the sensitivity is enhanced in the case of using a phosphor in which phosphor particles having a diameter of not less than 2 μm are included in an amount of not less than approximately 50% by weight, particularly not less than approximately 60% by weight, and more particularly not less than approximately 89% by weight, of the whole phosphor particles. On the other hand, in comparison between the content of phosphor particles having a diameter of not less than 60 μm in the panel 6 and that in the panel No. 7, it is understood that the image characteristics are improved in the case of using a phosphor in which phosphor particles having a diameter of not less than 60 μm are included in an amount of less than approximately 1% by weight of the whole phosphor particles.

For the reasons mentioned above, it is evident that a radiation image storage panel using a stimulable phosphor having such a particle size distribution that phosphor particles having a diameter of not less than 2 μm are present in an amount of not less than approximately 50% by weight, particularly not less than approximately 60% by weight, and more particularly not less than approximately 89% by weight, and phosphor particles having a diameter of not less than 60 μm are present in an amount of not more than approximately 1% by weight is more satisfactory in the sensitivity and image characteristics and is well balanced in these properties.

Furthermore, the radiation image storage panels No. 4 and No. 5 show particularly excellent sensitivity and image characteristics, being well balanced therebetween. Accordingly, in comparison between the content of phosphor particles having a diameter of not less than 5 μm in the panel No. 4 and that in the panel No. 3, and further in comparison between the content of phosphor particles having a diameter of not less than 30 μm in the panel No. 5 and that in the panel No. 6, it is understood that a radiation image storage panel using a stimulable phosphor having such a particle size distribution that phosphor particles having a diameter of not less than 5 μm are present in an amount of not less than approximately 35% by weight, particularly not less than approximately 50% by weight, and more particularly not less than approximately 55% by weight, and phosphor particles having a diameter of not less than 30 μm are present in an amount of not more than approximately 2% by weight is particularly satisfactory in the sensitivity and image characteristics, and is especially well balanced in these properties.

It has been further confirmed that there is shown a similar tendency in the relationship between the particle size distribution of the phosphor and the sensitivity and image characteristics of the panel containing it, even in other stimulable phosphors than the above-described BaFBr:Eu$^{2+}$ phosphor. Accordingly, the stimulable phosphor employable in the radiation image storage panel of the present invention is not limited to the BaFBr:Eu$^{2+}$ phosphor, and any stimulable phosphor which has the particle size distribution as defined hereinbefore can be employed in the radiation image storage panel of the invention.

Examples of the stimulable phosphors employable in the present invention include the following phosphors:

(i) SrS:Ce,Sm, SrS:Eu,Sm, La$_2$O$_2$S:Eu,Sm, and (Zn,Cd)S:MnX wherein X is halogen, as described in U.S. Pat. No. 3,859,527;

(ii) ZnS:Cu,Pb, BaO.xAl$_2$O$_3$:Eu wherein x is a number satisfying the condition of $0.8 \leq x \leq 10$, and M$^{II}$O.xSiO$_2$:A wherein M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,236,078;

(iii) LnOX:xA wherein Ln is at least one element selected from the group consisting of La, Y, Gd and Lu, X is Cl and/or Br, A is Ce and/or Tb, and x is a number satisfying the condition of $0 < x \leq 0.1$, as described in the above-mentioned U.S. Pat. No. 4,236,078;

(iv) (Ba$_{1-x}$, M$^{II}$x)FX:yA wherein M$^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 < y \leq 0.1$, respectively, as described in U.S. Pat. No. 4,239,968;

(v) (Ba$_{1-x-y}$,Mg$_x$,Ca$_y$)FX:aEu$^{2+}$ wherein X is at least one halogen selected from the group consisting of Cl, Br and I, x and y are numbers satisfying the conditions of $0 < x+y \leq 0.6$ and $xy \neq 0$, and a is a number satisfying the condition of $10^{-6} \leq a \leq 5 \times 10^{-2}$, as described in Japanese Patent Provisional Publication No. 55(1980)-12143;

(vi) BaFX:xCe,yA wherein X is at least one halogen selected from the group consisting of Cl, Br and I, A is at least one element selected from the group consisting of In, Ta, Gd, Sm and Zr, and x and y are numbers satisfying the conditions of $0 < x \leq 2 \times 10^{-1}$ and $0 < y \leq 5 \times 10^{-2}$, respectively, as described in U.S. Pat. No. 4,261,854;

(vii) BaF$_2$.aBaX$_2$.bMe$^I$F.cMe$^{II}$F$_2$.dMe$^{III}$F$_3$.eLn wherein X is at least one halogen selected from the group consisting of Cl, Br and I, Me$^I$ is Li and/or Na, Me$^{II}$ is at least one divalent metal selected from the group consisting of Be, Ca and Sr, Me$^{III}$ is at least one trivalent metal selected from the group consisting of Al, Ga, Y and La, Ln is at least one element selected from the group consisting of Eu, Ce and Tb, and a, b, c, d and e are numbers satisfying the conditions of $0.90 \leq a \leq 1.05$, $0 \leq b \leq 0.9$, $0 \leq c \leq 1.2$, $0 \leq d \leq 0.03$, $10^{-6} \leq e \leq 0.03$, respectively and $b=c=d \neq 0$, as described in Japanese Patent Provisional Publication No. 56(1981)-2385;

(viii) complex halide phosphor in which MgF$_2$ is added to the above-mentioned phosphor of Japanese Patent Provisional Publication No. 56(1981)-2385, as described in Japanese Patent Provisional Publication No. 56(1981)-2386;

(ix) BaFX.aLiX'.bBeX''$_2$.cM$^{III}$X'''$_3$:dA wherein each of X, X', X'' and X''' are at least one halogen selected from the group consisting of Cl, Br and I, $M^{III}$ is Al and/or Ga, A is at least one element selected from the group consisting of Eu, Tb, Ce, Tm, Dy, Pr, Ho, Nd, Yb, Er, Gd, Lu, Sm and Y, and a, b, c and d are numbers satisfying the conditions of $0 \leq a \leq 0.1$, $0 \leq b \leq 0.1$, $0 \leq c \leq 0.1$, $10^{-6} \leq d \leq 0.2$, respectively and $0 \leq a+b+c \leq 0.1$, as described in Japanese Patent Provisional Publication No. 56(1981)-74175; and the like.

The stimulable phosphor preferably is a divalent europium activated complex halide phosphor. Out of the divalent europium activated complex halide phosphor, a divalent europium activated alkaline earth metal fluorohalide phosphor is preferred. Out of the divalent europium activated alkaline earth metal fluorohalide phosphor, a divalent europium activated barium fluorohalide phosphor is preferred. Out of the divalent europium activated barium fluorohalide phosphor, a divalent europium activated barium fluorobromide ($BaFBr:Eu^{2+}$) phosphor is particularly preferred.

From the viewpoint of practical use, the stimulable phosphor preferably is a phosphor which emits light in the wavelength region ranging from 300 nm to 600 nm when stimulated by stimulating rays in the wavelength region ranging from 450 nm to 1100 nm, particularly from 450 nm to 750 nm.

The radiation image storage panel of the present invention consists essentially of a phosphor layer comprising a binder and a stimulable phosphor having the aforementioned particle size distribution and being dispersed in the binder. When the phosphor layer is self-supporting, the radiation image storage panel can consist solely thereof. However, the panel generally comprises a support and the phosphor layer provided thereonto. There is no specific limitation on the binder employed in the phosphor layer. The ratio between the amount of the binder and the amount of the phosphor generally ranges from 1:1 to 1:80 (binder:phosphor) by weight and preferably ranges from 1:5 to 1:50 by weight, and the thickness of the phosphor layer generally ranges from 20 μm to 1 mm, preferably from 100 μm to 500 μm, depending upon the purpose. There is no specific limitation on the support employed in the invention, but the support preferably employed is a plastic sheet having flexibility.

In the radiation image storage panel of the present invention, one or more layers can be optionally placed between the support and the phosphor layer, such as a light reflecting layer, a light absorbing layer and an undercoating layer (subbing layer).

Further, a protective layer is generally provided onto the phosphor layer in a thickness ranging from 3 μm to 20 μm, to chemically and physically protect the phosphor layer. Furthermore, the radiation image storage panel of the present invention can be colored with a coloring agent, to enhance the sharpness of the image, as described in Japanese Patent Provisional Publication No. 56(1981)-163500. For the same purpose, a white powder can be dispersed in the phosphor layer of the panel, as described in U.S. Patent No. 4,350,893.

As described hereinbefore, the radiation image storage panel of the present invention shows high sensitivity and excellent image characteristics, being well balanced therebetween. For this reason, the radiation image storage panel provided by the present invention is of prominent value in practical use.

We claim:

1. A radiation image storage panel having a phosphor layer comprising a binder and a stimulable phosphor dispersed therein, in which said stimulable phosphor has such a particle size distribution that phosphor particles having a diameter of not less than 100 μm are present in an amount of not more than 1% by weight and phosphor particles having a diameter of not less than 1 μm are present in an amount of not less than 50% by weight.

2. The radiation image storage panel as claimed in claim 1, in which said stimulable phosphor has such a particle size distribution that phosphor particles having a diameter of not less than 60 μm are present in an amount of not more than 1% by weight and phosphor particles having a diameter of not less than 2 μm are present in an amount of not less than 50% by weight.

3. The radiation image storage panel as claimed in claim 1, in which said stimulable phosphor has such a particle size distribution that phosphor particles having a diameter of not less than 30 μm are present in an amount of not more than 2% by weight and phosphor particles having a diameter of not less than 5 μm are present in an amount of not less than 35% by weight.

4. The radiation image storage panel as claimed in any one of claims 1 through 3, in which said stimulable phosphor is a divalent europium activated complex halide phosphor.

5. The radiation image storage panel as claimed in claim 4, in which said divalent europium activated complex halide phosphor is a divalent europium activated alkaline earth metal fluorohalide phosphor.

6. The radiation image storage panel as claimed in claim 5, in which said divalent europium activated alkaline earth metal fluorohalide phosphor is a divalent europium activated barium fluorohalide phosphor.

7. The radiation image storage panel as claimed in claim 6, in which said divalent europium activated barium fluorohalide phosphor is a divalent europium activated barium fluorobromide phosphor.

* * * * *